US008788804B2

(12) United States Patent
Nagaraja

(10) Patent No.: US 8,788,804 B2
(45) Date of Patent: Jul. 22, 2014

(54) CONTEXT AWARE SECURITY

(75) Inventor: Nagendra Nagaraja, Bangalore Karnataka (IN)

(73) Assignee: QUALCOMM Incorporated, San Diego, CA (US)

( * ) Notice: Subject to any disclaimer, the term of this patent is extended or adjusted under 35 U.S.C. 154(b) by 1234 days.

(21) Appl. No.: 12/121,571

(22) Filed: May 15, 2008

(65) Prior Publication Data

US 2009/0319771 A1    Dec. 24, 2009

(51) Int. Cl.
*H04L 29/06* (2006.01)

(52) U.S. Cl.
USPC .............................................. 713/151; 726/1

(58) Field of Classification Search
CPC . H04L 63/105; H04L 63/0869; G06F 21/606; G06F 21/445
USPC ......................................................... 713/151
See application file for complete search history.

(56) References Cited

U.S. PATENT DOCUMENTS

| | | | |
|---|---|---|---|
| 6,915,426 B1* | 7/2005 | Carman et al. | 713/168 |
| 6,980,816 B2* | 12/2005 | Rohles et al. | 455/456.1 |
| 7,143,283 B1* | 11/2006 | Chen et al. | 713/153 |
| 7,219,223 B1* | 5/2007 | Bacchus et al. | 713/150 |
| 7,304,570 B2* | 12/2007 | Thomas et al. | 713/166 |
| 7,907,934 B2* | 3/2011 | Naghian | 455/410 |
| 2002/0087649 A1* | 7/2002 | Horvitz | 709/207 |
| 2002/0131600 A1* | 9/2002 | Ionescu | 380/277 |
| 2002/0169965 A1* | 11/2002 | Hale et al. | 713/182 |
| 2004/0123153 A1* | 6/2004 | Wright et al. | 713/201 |
| 2006/0282545 A1* | 12/2006 | Arwe et al. | 709/237 |
| 2007/0174613 A1* | 7/2007 | Paddon et al. | 713/168 |
| 2010/0293369 A1* | 11/2010 | Ramharter | 713/151 |

OTHER PUBLICATIONS

Ashri, Ronald, et al., Towards a semantic web security infrastructure, 2004, American Association for Artificial intelligence, p. 4 & 5.*
Bellavista, Paolo, et al., A Mobile computing middleware for location- and context-aware internet data services, Nov. 2006, ACM Transactions on Internet Technology, vol. 6, No. 4, p. 358 & 359.*
Struber, Gordon L., Priciples of mobile communication, 2001, Kluwere Academic Publishers, Frouth printing 2004, 2 pages.*
Schumacher, Markus, et al., Security engineering with patterns, 2001, Markus Schumaher, p. 16.*
Ristenbatt, Marlin P., Methodology for network communication vulnerability analysis, 1988, IEEE, pp. 495-497.*

(Continued)

*Primary Examiner* — Kambiz Zand
*Assistant Examiner* — Ali Shayanfar
(74) *Attorney, Agent, or Firm* — Won Tae Kim

(57) ABSTRACT

Layered semantic security provides a high degree of security for a mobile device based upon contextual awareness that dynamically changes based upon interaction between a user and a near communication device, which in turn interacts with a network, which ultimately interacts to a far communication device. Generating a shared secret key with a master secret and changing contextual information based on context awareness provides immunity to chosen plain text attacks by providing semantic security at each layer. Thereby, relying upon the overall robustness of the layering of semantic security, processing and power resources consumed can be advantageously adjusted dynamically to enhance concurrent use and service life of a mobile communication device.

42 Claims, 9 Drawing Sheets

(56) References Cited

OTHER PUBLICATIONS

NPL "A Survey of Context-Aware Mobile Computing Research" (Nov. 14, 2005) by Guanling Chen et al.; 25 pages; originally downloaded from http://mmlab.snu.ac.kr/courses/2005_advanced_internet/handout/ppt/36%20-%20context_aware.pdf.*

Covington, et al., "Securing Context-Aware Applications Using Environment Roles", ACM workshop on Role Based Access Control, Proceedings of the Sixth ACM Symposium on Access Control Models and Technologies, 11 pages, 2001.*

International Search Report and the Written Opinion—PCT/US2009/044224, International Search Authority—European Patent Office—Oct. 15, 2009.

Kiyeal Lee et al: "Context-aware security service in RFID/USN environments using MAUT and extended GRBAC" Digital Information Management, 2007. ICDIM 07. 2ND International Conference on, IEEE, Piscataway, NJ, USA, Oct. 1, 2007, pp. 303-308, XP031211187 ISBN: 978-1-4244-1475-8 sections 3.1-3.4, 4.1 figures 1-5; table 1.

Seon-Ho Park et al: "Context-Aware Security Management System for Pervasive Computing Environment" Modeling and Using Context; [Lecture Notes in Computer Science], Springer Berlin Heidelberg, Berlin, Heidelberg, vol. 4635, Aug. 20, 2007, pp. 384-396, XP019067199 ISBN: 978-3-540-74254-8 sections 3-6 figures 1,3,5; table 1.

* cited by examiner

CONTEXT AWARE SECURITY

BACKGROUND

1. Field

The present invention generally relates to communications, and more particularly, to secure and private communications using shared secrets generated from context limited information.

2. Background

The use of shared secrets is common for communications that are intended to be secure or private. In a typical shared secret scheme, a common secret known only to the communicating entities is shared, which secret is relied upon by the communicating entities to establish a trust relationship. A party without the shared secret is excluded from the trust relationship.

The shared secret can either be permanent or temporary. A temporary shared secret can be used to protect a communication for a limited period. For example, the temporary shared secret can be good only for a one-time transaction.

To provide an extra level of security, very often, a temporary secret is derived from a permanent secret. In such an arrangement, the temporary secret is used as the basis for establishing the trust relationship. For instance, a party seeking to establish a trust relationship with a corresponding party may use the temporary secret, which is shared with the corresponding party as key material for cryptographic communications with the corresponding party.

As for the permanent secret, sometimes called the master secret, it is rarely unrestrictively shared. By way of example, in a mobile communication setting, a master secret is shared only between the subscriber unit and the subscriber's home carrier. When the subscriber unit requests services via secure communications from a third party, the subscriber unit generates a temporary secret from the master secret. At the same time, the subscriber unit also sends a request to the home carrier which in turn generates the same temporary secret from the shared master secret. Again, the temporary secret forms the basis of the trust relationship between the subscriber and the third party. For instance, both the subscriber unit and the home carrier may generate from the temporary secret, among other things, an encryption key which is then made available to the service provider. Cryptographic communications between the subscriber unit and the service provider can be exchanged thereafter.

The rationale for deriving a temporary secret from the master secret is to curtail likelihood of revelation of the master secret. Derivation of the temporary secret from the master secret can be based on some prearranged algorithms between the subscriber unit and the home carrier.

The above-described security model is based on the assumption that any third party who may have access to any derived secret would have an interest in preserving the confidentiality of the derived secret. For instance, if the third party reveals the derived secret to yet another party, the confidence in purchasing services from the third party would be seriously jeopardized. As such, the third party would be adversely affected as a sustaining business entity, not to mention the legal consequences of revealing the secret.

However, there may be some parties that neither have the economical motivation nor ethical consideration in keeping the shared secret a secret. For example, if the derived secret is passed to a rogue party set up as a subscriber, the rogue party can use the derived secret to impersonate the legitimate subscriber and gain access to services which otherwise would be inaccessible to the rogue party. To compound the situation, additional sensitive information can further be revealed from the illegitimate access. The same holds true, if not with more severe consequences, is that the rogue party sets itself up as a service provider.

To address these issues, it has been proposed in a communication system in which two communication entities seek to have a private or confidential communication session, a trust relationship needs first be established. The trust relationship is based on the determination of a shared secret which in turn is generated from contextual information. The contextual information can be derived from the circumstances surrounding the communication session. For example, the contextual information can include topological information, time-based information, and transactional information. The shared secret may be self-generated or received from a third party. In either event, the shared secret may be used as key material for any cryptographic protocol used between the communication entities.

While this context limited shared secret provides greater security, it would be desirable to provide additional improvements. For example, the encoding and decoding using such contextual information and a master secret tends to impose a static performance burden on an end user's communication device, which can have a significant impact on mobile devices of limited power storage and computational abilities. Further, it can still be feasible for a computationally-bounded adversary to derive significant information about a message (plaintext) when given only its ciphertext and the corresponding public encryption key

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing optimal security in a mobile device according to context of usage, balancing the effective security needs against performance constraints of the mobile device. Layering security based upon changing contextual information makes malicious interception and decryption difficult if not infeasible.

In one aspect, a method is provided for establishing layered semantic security between a near communication device and a far communication device. Contextual information is collected regarding a selected one of the near and far communication devices. Security vulnerability is characterized based upon the contextual information. A cryptographic protocol is selected based upon the security vulnerability characterization. A trust relationship can then be established with a far communication device by employing the selected cryptographic protocol.

In another aspect, at least one processor is provided for establishing layered semantic security between a near communication device and a far communication device. A first module collects contextual information regarding a selected one of the near and far communication devices. A second module characterizes a security vulnerability based upon the contextual information. A third module selects a cryptographic protocol based upon the security vulnerability characterization. A fourth module establishes a trust relationship with a far communication device employing the selected cryptographic protocol.

In an additional aspect, a computer program product is provided for establishing layered semantic security between a near communication device and a far communication device. A computer readable medium comprises sets of codes causing a computer to collect contextual information regarding a selected one of the near and far communication devices, to characterize a security vulnerability based upon the contextual information, to select a cryptographic protocol based upon the security vulnerability characterization, and to establish a trust relationship with a far communication device employing the selected cryptographic protocol.

In a further aspect, an apparatus is provided for establishing layered semantic security between a near communication device and a far communication device. Means are provided for collecting contextual information regarding a selected one of the near and far communication devices. Means are provided for characterizing a security vulnerability based upon the contextual information. Means are provided for selecting a cryptographic protocol based upon the security vulnerability characterization. Means are provided for establishing a trust relationship with a far communication device employing the selected cryptographic protocol.

In another additional aspect, an apparatus is provided for establishing layered semantic security between a near communication device and a far communication device. A memory collects contextual information regarding a selected one of the near and far communication devices. A context awareness component characterizes a security vulnerability based upon the contextual information and selects a cryptographic protocol based upon the security vulnerability characterization. A communication component for establishing a trust relationship with a far communication device employs the selected cryptographic protocol.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
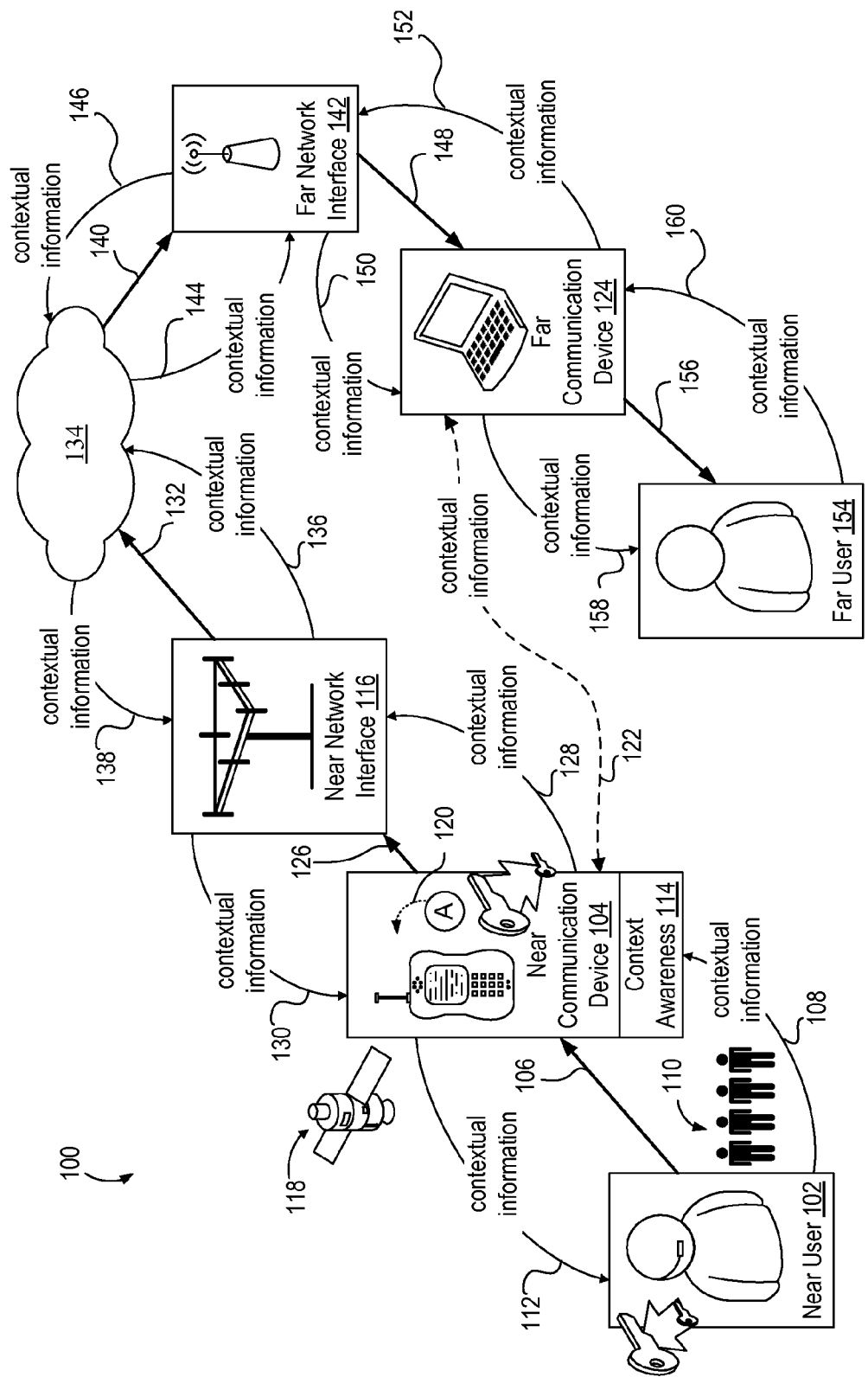
FIG. 1 is a communication system between a near mobile device to a far communication device employing layered semantic security based upon dynamic context awareness.

In a communication system in which two communication entities seek to have a private or confidential communication session, a trust relationship needs first be established. The trust relationship is based on the determination of a shared secret which in turn is generated from contextual information. The contextual information can be derived from the circumstances surrounding the communication session. For example, the contextual information can include topological information, time-based information, and transactional information. The shared secret may be self-generated or received from a third party. In either event, the shared secret may be used as key material for any cryptographic protocol used between the communication entities.

Extending this approach to mobile devices, an opportunity exists for layering semantic security, which can be very difficult or impossible to break, while adjusting the computational burden on a mobile device, balancing processor performance and battery service life against security needs. When a user interacts with a mobile device and the mobile device interacts with a network and the network with another mobile device, it will be impossible for any hacker to derive information from any of these interaction interfaces either about plain text or private key, when he knows the cipher text. The layered semantic security provides a "context awareness" of the overall system as contexts change and security levels and security types are dynamically changed from communication link to communication link within the communication system. Unlike conventional semantic security, this layered semantic security is immune to chosen plain text attacks. This is because for any chosen plaintext attack to obtain information about the key or authentication information one should know the context of particular layer and also relation between interlayer contexts, meaning that one should know what the relation is between the context generated by one layer to its previous layer. This information provides a semantic security at each layer, making it impossible for an attacker to break.

This increased security is achieved without placing an untoward burden on a mobile device. In fact, an opportunity exists for adjusting the security processing burden on the mobile device by leveraging context awareness as to the actual security needs rather than imposing a static level of security regardless of need. If we consider ourselves as cryptanalysts, then we can see that because of context flow which is dynamic, random and depends on user, device and network states, we see that the entropy of system is very high. If we take the network, device and user perspective, the entropy of the system is low, because they interact on certain pre-negotiated contexts which change dynamically. For cryptanalyst it is very difficult break something which changes so dynamically. So by providing large value of entropy to cryptanalyst or hacker and small value of entropy to device, user and network by using dynamically varying context flow, we create highly secure and less expensive security system.

For clarity, context awareness of security can be characterized in the following categories: (1) Between user and device; (2) Between device and network; and (3) Between Device and another device. With regard to the first category between user and device, current static approaches like "password" are used as only security measure. Biometry is being used increasingly, but still has certain vulnerabilities. Enhancing these existing static user-device security measure is the disclosed new type of security that provide dynamic or some sort of semantic security to this interface is "context aware security". If the device and user understands in which context user-device are interacting, then user device security at this interface can be dynamically changed according to context. Context is derived from background noise, location (e.g., global positioning system (GPS), and motion sensing (e.g., MEMS-based motion sensing gyrometer) for measuring rotation/acceleration of the mobile device to determine the context. There is good amount context that can be obtained from various device and user based information. This particular interface is where most innovation in security happens. Advantageously, the mobile device understands the context and changes the required security level or security type at this interface; user understands the context and accordingly knows how to authenticate.

With regard to the second context between the mobile device and the network, before interacting, the mobile device authenticates the network. The network can be a personal access network (PAN), Wi-Fi or wireless wide area network (WAN) networks. It should be appreciated with the benefit of the present disclosure that aspects disclosed herein have application in addition to ad hoc networks.

With regard to the third context between one mobile user and another mobile user, the far-end mobile device receives the context from the network and accordingly uses appropriate security level or security protocol.

In addition to link specific context information, the context for the third category (i.e., end device to end device) can be derived from the context of the second category (i.e., each device to the network) as one of the inputs. The context for the second category in turn can be derived in part from the context for the first category (i.e., user to mobile device). The context for the first category in turn obtains context from device sensors (e.g., GPS, motion indicator, position indicator, etc.).

So having this layered approach for security reduces worry of the static approach followed now and also helps in using resources efficiently. These are resources like computation power of a resource constrained device like a mobile phone, battery of low power devices, network bandwidth, and user time.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Turning to the Drawings, in FIG. 1, communication system 100 for performing layered semantic security includes a near user 102 who is using a near communication device, depicted as a mobile device 104, for establishing a communication channel 106 (e.g., keyboard, visual, auditory, data, etc.). The user is conveying context information as depicted at 108. Examples of context can include ambient noise that is characterized as being alone or in close proximity to others, depicted at 110. Another example, contextual information can inform the mobile device 104 of how secure the medium is between the user 102 and the mobile device 104 (e.g., earphone versus open speaker, wide aspect display versus narrow aspect display, keyboard versus touch graphical user interface, etc.). The contextual information 108 can include user settings specifying a degree of security concern for a particular communication session. In response, the mobile device 104 can convey to the user 102 contextual information depicted at 112, such as indicating a need for unlocking an otherwise secured text message with an appropriate authentication.

The mobile device 104 employs a context awareness component 114 to adjust an amount of security between the user 102 and the device 104 or between the mobile device 104 and a near network interface 116. This context awareness component 114 can leverage contextual information derived from a location/position indicator, depicted as a GPS satellite 118. The context awareness component 114 can leverage contextual information derived from motion indication, depicted as an accelerometer 120. The contextual awareness component 114 can also monitor security contributions made by other links in the communication system 100, depicted at 122 as contextual information from a far communication device 124. In particular, each automated communication link can add an additional layer of semantic security or at least pass on contextual information from adjacent communication links as an intermediary.

To that end, a communication link is depicted at 126 between the near communication device 104 and the near network interface 116 based in part upon contextual information depicted at 128 passing from the mobile device 104 to the near network interface 116 or as depicted at 130 passing from the near network interface 116 to the near mobile device 104. Another communication link is depicted at 132 between the near network interface 116 and a multi-hop network 134 based in part upon contextual information depicted at 136 passing from the near network interface 116 to the multi-hop network 134 or as depicted at 138 passing from the multi-hop network 134 to the near network interface 116. An additional communication link is depicted at 140 between the multi-hop network 134 and a far network interface 142 based in part upon contextual information depicted at 144 passing from the multi-hop network 134 to the far network interface 142 or as depicted at 146 passing from the far network interface 142 to the multi-hop network 134. A further communication link is depicted at 148 between the far network interface 142 and the far communication device 124, based in part upon contextual information depicted at 150 passing from the far network interface 142 to the far communication device 124 or as depicted at 152 passing from the far communication device 124 to the far network interface 142.

A far user 154 receives a communication link, either automated or human perceptible, depicted at 156, from the far communication device 124, which can include forward contextual information depicted at 158 or reverse contextual information depicted at 160.

It should be appreciated with the benefit of the present disclosure that the techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

FIGS. 2, 3, and 5-8 illustrate methodologies and/or flow diagrams in accordance with aspects of the present invention. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with various aspects of the present invention. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 2:
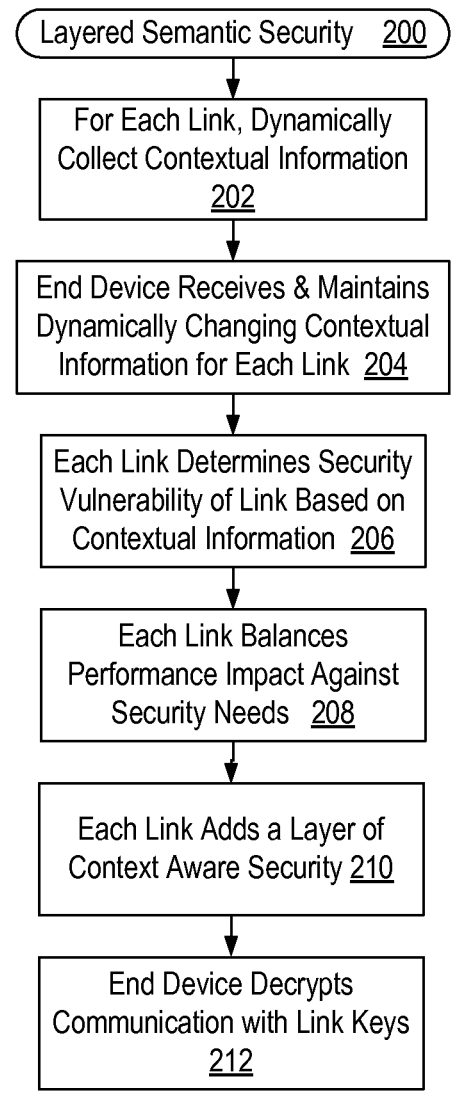
FIG. 2 is a flow diagram of a methodology for layered semantic security.

In FIG. 2, a methodology 200 for layered semantic security includes each link dynamically collecting contextual information in block 202. In block 204, each link can receive and maintain dynamically changing contextual information from other links. Each link can dynamically determine security vulnerability of a particular link based upon contextual information in block 206. In response to a degree of vulnerability in block 208, each link can balance performance impacts against security needs. For example, key length for encryption can be varied to trade-off processing versus security. As another example, a different type of authentication can be employed for a short range communication link versus a long range communication link. As a further example, a number of replays required for errored reception can be changed, such as for thwarting a software virus from trying to infect the mobile device. In block 210, each link adds a layer of context aware security, increasing the overall security of the communication. In block 212, the end device decrypts the communication with the layer link keys.

Figure 3:
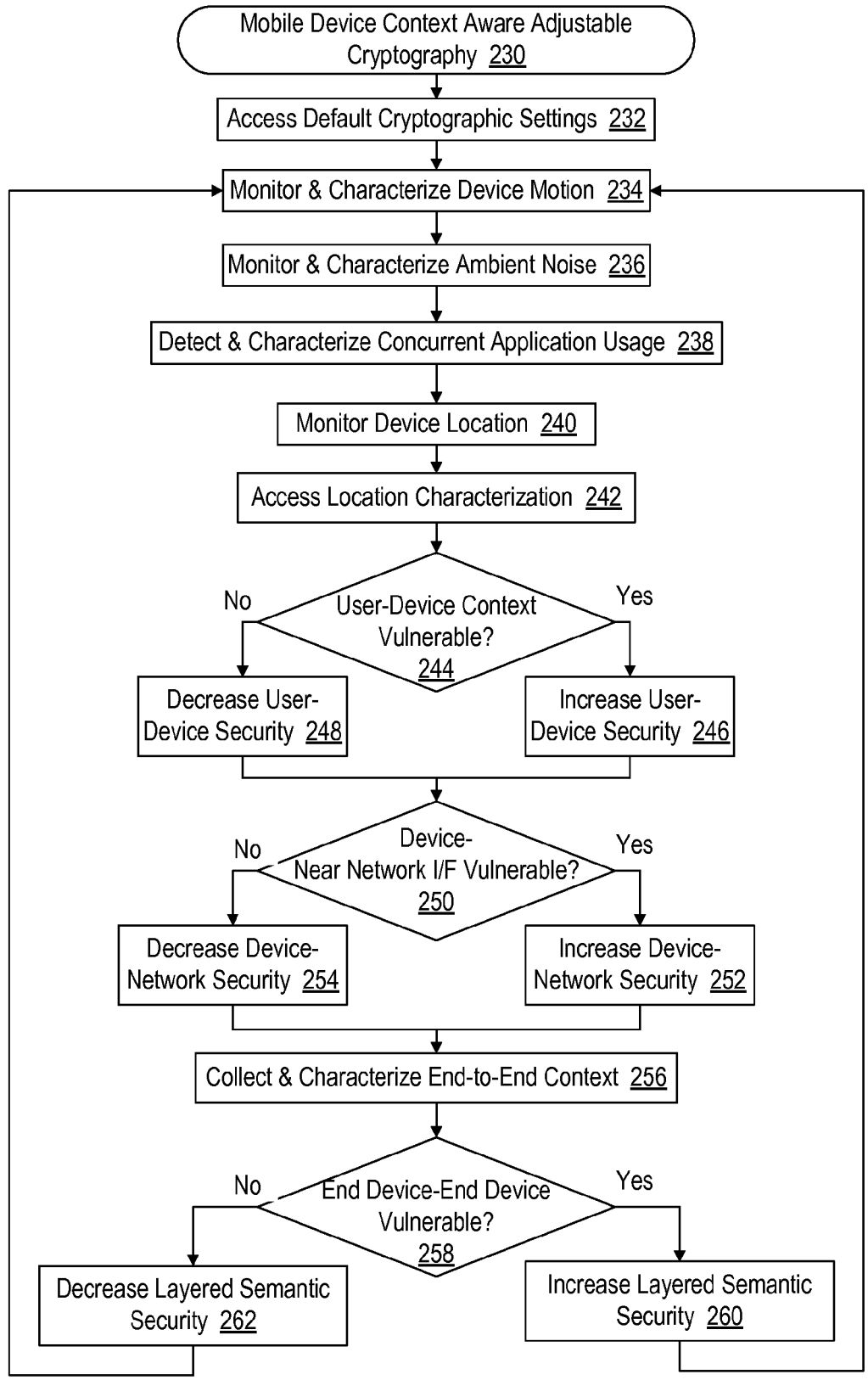
FIG. 3 is a flow diagram of a methodology for mobile device context aware adjustable cryptography to balance device performance with security needs for the methodology of FIG. 2.

In FIG. 3, a methodology 230 is depicted for mobile device to dynamically adjust cryptography based upon context awareness. In block 232, the default cryptographic settings are accessed. In block 234, device monitors and characterizes motion. For example, motion can indicate pedestrian motion, a stationary but human-carried condition, a wholly stationary (not carried) condition, vehicular travel, user viewing of the device, etc. In block 236, the device monitors and characterizes ambient noise, such as determining a likelihood of being in a private setting or a public setting. In block 238, the device detects and characterizes concurrent application usage, for example, a web access interface, a game application, or a scheduling application being used by the user. In block 240, the device monitors and characterizes location, such as detecting a geographic coordinate. In block 242, the location is characterized, such as by accessing a database identifying types of facility based on location. In block 244, a determination is made as to whether the context aware information indicates security vulnerability in the user-device interface. If so, the user-device security level is increased in block 246. If not, the user-device security level is decreased in block 248.

In block 250, a further determination is made as to whether the context aware information indicates vulnerability in the communication link between the device and a near network interface. If so, security is increased between the device and the near network interface in block 252. If not, security is decreased between the device and the network interface in block 254.

In block 256, the device collects and characterizes end-to-end context information. In block 258, a determination is made as to whether end device to end device communication is vulnerable. If so, layered semantic security is increased in block 260. If not, layered semantic security is decreased in block 262.

Figure 4:
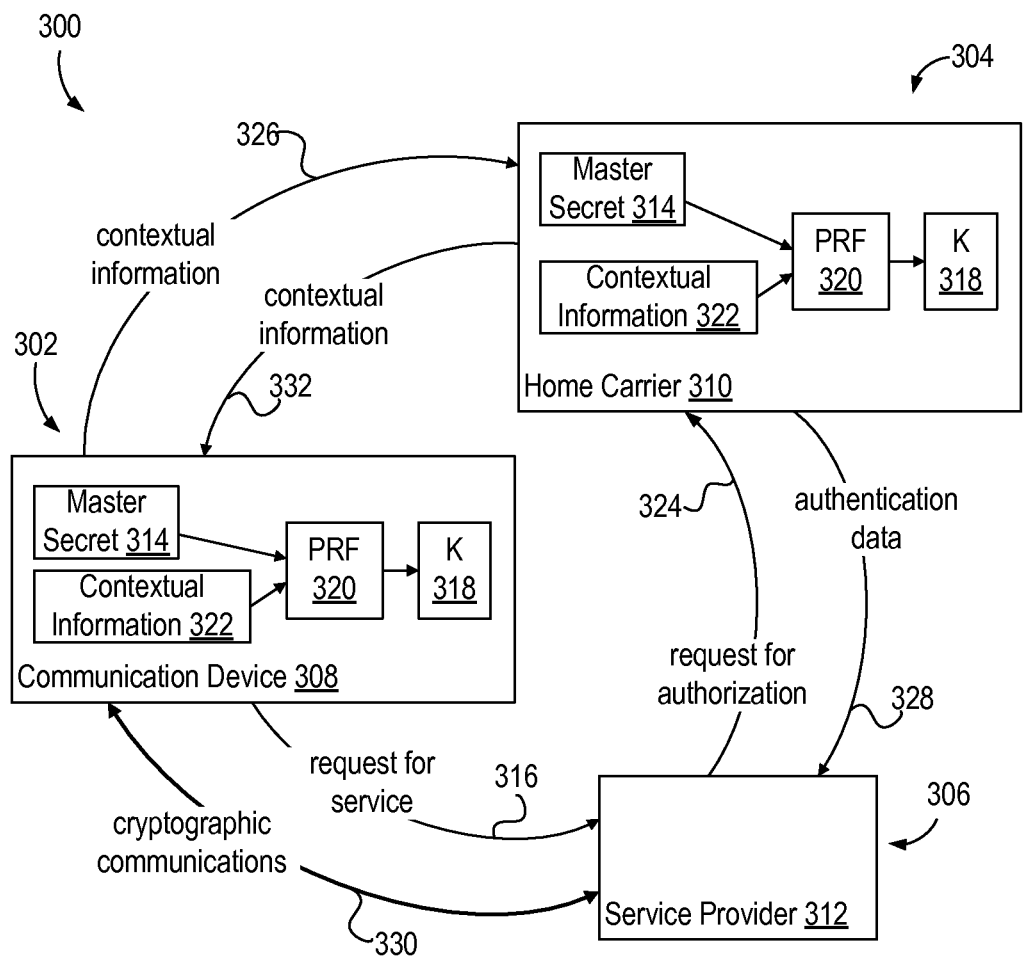
FIG. 4 is a simplified schematic drawing of a communication link of the communication system employing context limited shared secret cryptography.

For clarity, in FIG. 4, a communication system 300 comprising just one link is depicted for adding a single layer of context aware security. The communication system 300 can be a system carrying voice, data, multimedia, or combination thereof. Furthermore, the system 300 can be operated under various standards and protocols, examples are the CDMA2000 (Code Division Multiplex Access 2000), GSM (Global System for Mobile communication), WCDMA (Wideband Code Division Multiple Access), and IP (Internet Protocol).

For a clear and concise illustration, only three entities are shown in FIG. 4, namely, a first communication entity 302, a second communication entity 304, and a third communication entity 306. In this exemplary aspect, the first entity 302 is a communication device 308. The second entity 304 is a home carrier 310. The third aspect 306 is a service provider 312.

Suppose in this example, the communication device 308 is a subscriber of the home carrier 310. The communication device 308 can be a wired device, for example, the device 308 can be a work station wired to the same network as the home carrier 310. Alternatively, the communication device 308 can be a wireless device. For instance, the device 308 can be a mobile telephone, a mobile computer, or a personal digital assistant (PDA). As such, the communication device 308 can be within the same network as the home carrier 310. In addition, the communication device 308 can also be positioned outside of the network of the home carrier 310. For example, the communication device 308 may roam away from the network of the home carrier 310 to other networks and may communicate with other entities in other networks.

Reference is now directed back to FIG. 4. Suppose in this example, the communication device 308 requests a service from the service provider 312. The service requested can be a service normally requested from the home carrier 310 when the communication device 308 is in the network of the home carrier 310. As another example, the service requested can also be a service provided only by the service provider 312 but not by the home carrier 310. The service provider 312 can be within or beyond the network of the home carrier 310.

For security and privacy reasons, the communication device 308 may first want to ensure that the service provider 312 is authorized for the provision of the service. Likewise, the service provider 312 in turn may also need to know that the communication device 308 is legitimate, for example, for purpose of billing. Differently put, prior to any communication, a trust relationship needs first be established between the communication device 308 and the service provider 312.

In accordance with this aspect, the communication device 308 and the home carrier 310 share a master secret, symbolically identified by the reference numeral 314 in FIG. 4.

To start the process, the communication device 308 first sends a request of service to the service provider 312, signified by a communication path 316. Thereafter, the process of establishing a trust relationship follows.

For the communication device 308, it first generates a shared secret K 318 via a pseudo-random function (PRF) 320. Inputs to the PRF 320 can include, among other things, the master secret 314 and contextual information 322.

Examples of a PRF 320 can be a Hash-based Message Authentication Code (HMAC), a Secure Hash Algorithm 1 (SHA-1), or a combination thereof. Both the HMAC and the SHA-1 can be found in Request for Comments (RFC) published by the Internet Engineering Task Force (IETF). Specifically, the HMAC is set forth in RFC 2104, entitled "HMAC: Keyed-Hashing for Message Authentication," February 1997. The SHA-1 algorithm is defined in RFC 3174, entitled "U.S. Secure Hash Algorithm 1," September 2001.

In accordance with this aspect of the invention, contextual information 322 can be derived from the circumstances surrounding the communication session.

Contextual information 322 can be topologically based. For instance, operating under the IP, the topological information can include the source and destination addresses of the various entities 302, 304 and 306 as shown in FIG. 4. In addition, the aforementioned addresses can additionally include network masks specifying blocks of addresses for an additional level of security. For communications under the Transport Control Protocol (TCP) and User Datagram Protocol (UDP), source and destination ports can also be included.

Contextual information 322 can also be time related. That is, certain time parameters surrounding the circumstances of the communication session can be used for the contextual information. For example, the contextual information 322 can include the start time, end time, duration of a particular communication session, such as the session of the service request 316 sent by the communication device 308 to the service provider 312.

Contextual information 322 can also be transactionally specific. Very often, under various communication systems, each communication session is uniquely identified with an identifier, commonly called a nonce or a transactional identifier. Such identifying information can also be used and included as contextual information.

As mentioned earlier, to generate a shared secret K 318, inputs to the PRF 320 can include the master-secret 314 and the contextual information 322. Mathematically, it can be represented as follows: K=PRF (master_secret, contextual_information) (A) where master_secret is for example, the master secret 314 as aforementioned, and contextual_information can further be represented as follows: contextual_information=.orgate.(server_address, server_port, start_time, end_time, random_nonce) (B) where .orgate. denotes a set of parameters as included in the parenthesis of equation (B). In this particular example, server_address is the network address of the service provider 312, server_port is the port number of the service provider 312, start_time is the beginning of the time of the communication device 308 sends the service request 316 to the service provider 312, end_time is the end of the time the aforementioned service request ends.

On the part of the service provider 312, upon receipt of the request of service from the communication device 308, the service provider 312 informs the home carrier 310 for authorization, as identified by a communication path 324 in FIG. 4. At the same time, either out of its own initiative or upon request from the home carrier 310, the communication device 308 sends the contextual information 322 to the home carrier 310, as identified by a communication path 326. With the contextual information 322 and the prestored master secret 314, the home carrier 310 in turn generates a shared secret K 318 in accordance with equations (A) and (B) in the same manner as the communication device 308 generating the shared secret K 318 as described previously.

The shared secret K 318 provides supporting basis for subsequent secure communications between the service provider 312 and the communication device 308.

For example, for secure and private communications, various cryptographic protocols can be later used between the service provider 312 and the communication device 308. Each of the cryptographic protocols may require an encryption key Ke to encrypt the secure communication data. The encryption key Ke can be generated from the shared secret K 318.

As another example, if applicable, the shared secret K 318 can be used to generate challenge data exchanged between the service provider 312 and the communication device 308. The challenge data may include a challenge message and an expected response. The expected response can only be generated from the challenge message and with the knowledge of the shared secret K 318. For instance, referring to FIG. 4, if the service provider 312 has received the shared secret K 318 from the home carrier 310, the service provider 312 may challenge the authenticity of the communication device 308 by sending a challenge message to the communication device 308. The communication device 308 has possession of the shared secret K 318. The communication device 308 can then generate an expected message based on the shared secret K 318 and send the expected message to the service provider 312 for authentication. The service provider 312 may thereafter determine the authentication of the communication device 308 by comparing the received expected message from communication device 308 and its self-generated expected message based on the share secret K 318 which was previously received from the home carrier 310.

Reference is now continued with FIG. 4. In response to the request for authorization 324 and depending on the cryptographic protocol to be used later, the home carrier 310 sends authentication data, which in this example includes the shared secret K 318 to the service provider 312, as identified by a communication path 328. The transmission of the authentication data via the communication path 328 may be protected by pre-arranged security mechanisms.

Once the communication device 308 and the service provider 312 possess the shared secret K 318, they can use the secret K 318 as key material to establish cryptographically secured communications. The communication path of the cryptographic communications between the communication device 308 and the service provider 312 is denoted by the reference numeral 330 as shown in FIG. 4.

Figure 5:
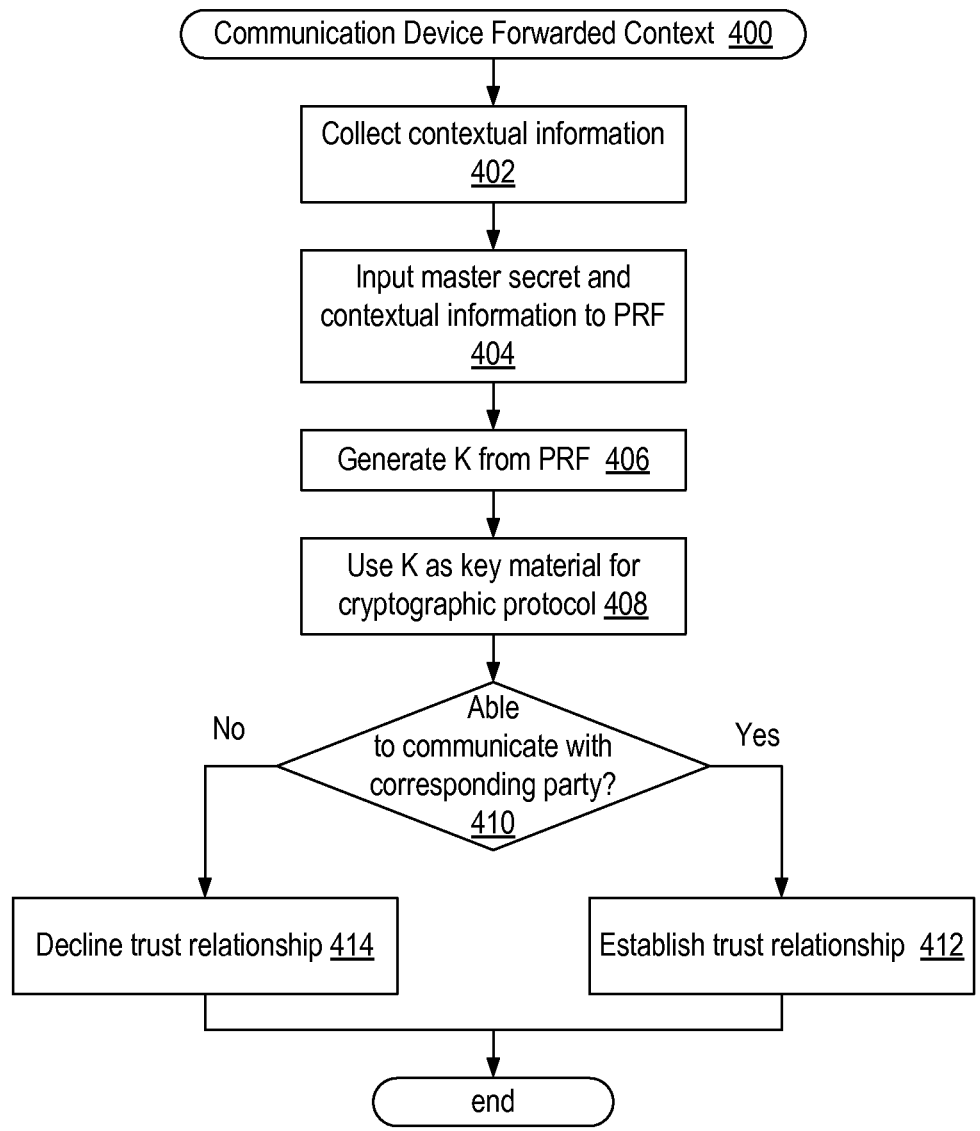
FIG. 5 is a flow diagram in accordance with one aspect of a methodology involved by a communication entity seeking first to establish a trust relationship for a communication session.

The process as described above is summarized in the flow diagrams of FIGS. 5 and 6. FIG. 5 shows a methodology 400 executed by the communication device 308 for initiating a context aware security communication session with forwarded context information. In block 402, the communication device collects context information. In block 404, the master secret and context information are input to a pseudo random function (PRF). In block 406, a secret K is generated from the PRF. In block 408, the secret K is used as key material for a cryptographic protocol. In block 410, a determination is made as to whether the communication device is able to communicate with the corresponding party. If so, then a trust relationship is established in block 412 and otherwise a trust relationship is declined in block 414.

Figure 6:
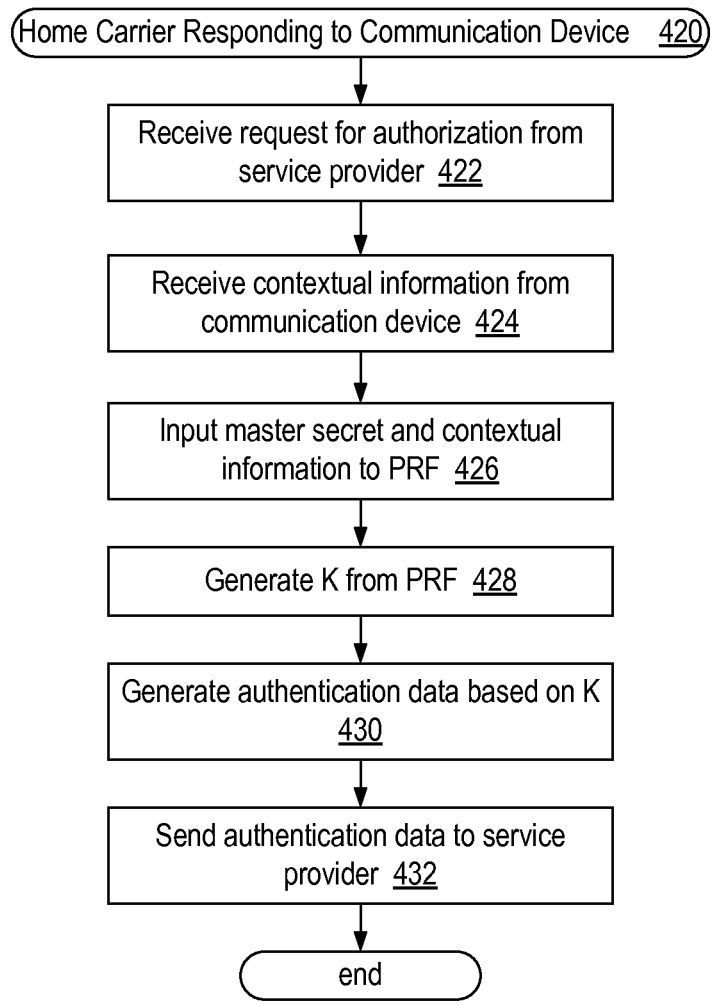
FIG. 6 is a flow diagram in accordance with the aspect of FIG. 5 of a methodology involved by an intermediary entity facilitating establishment of the trust relationship.

FIG. 6 depicts a corresponding methodology 420 performed by the home carrier 310 that receives a request for authorization from the service provider 312 in block 422. Then in block 424, the home carrier receives contextual information 322 from the communication device 308. In response, the master secret 314 and contextual information 322 are input to the PRF 320 in block 426. Then, in block 428, the PRF is used to generate shared secret K 318. In block 430, authentication data is generated based on the master K for sending to the service provider 312 in block 432.

Operating in the manner as described above, if the shared secret K 318 is improperly divulged to an unauthorized party, the likelihood of unauthorized use of the secret K 318 by the unauthorized party to masquerade as a legitimate secret holder is substantially reduced because the exact contextual information 322 for which the shared secret K 318 was originally generated must be replicated in order to succeed.

Alternatively, instead of having the communication device 308 send the contextual information to the home carrier 310, the reverse can also be possible. That is, upon receipt of the request for authorization from the service provider 312, the home carrier 310 can send the contextual information 322, as depicted as a communication path 332 to the communication device 308. For instance, the predetermined parameters start_time and end_time in Equation (B) can be set at respectively the start and end times of the authorization request 324 as shown in FIG. 4. The communication device 308 can then use the received contextual information to generate the shared secret K 318. Again, the shared secret K 318 again may be used as key material appropriate to any cryptographic protocol to be used for cryptographic communications between the communication device 308 and the service provider 312.

Figure 7:
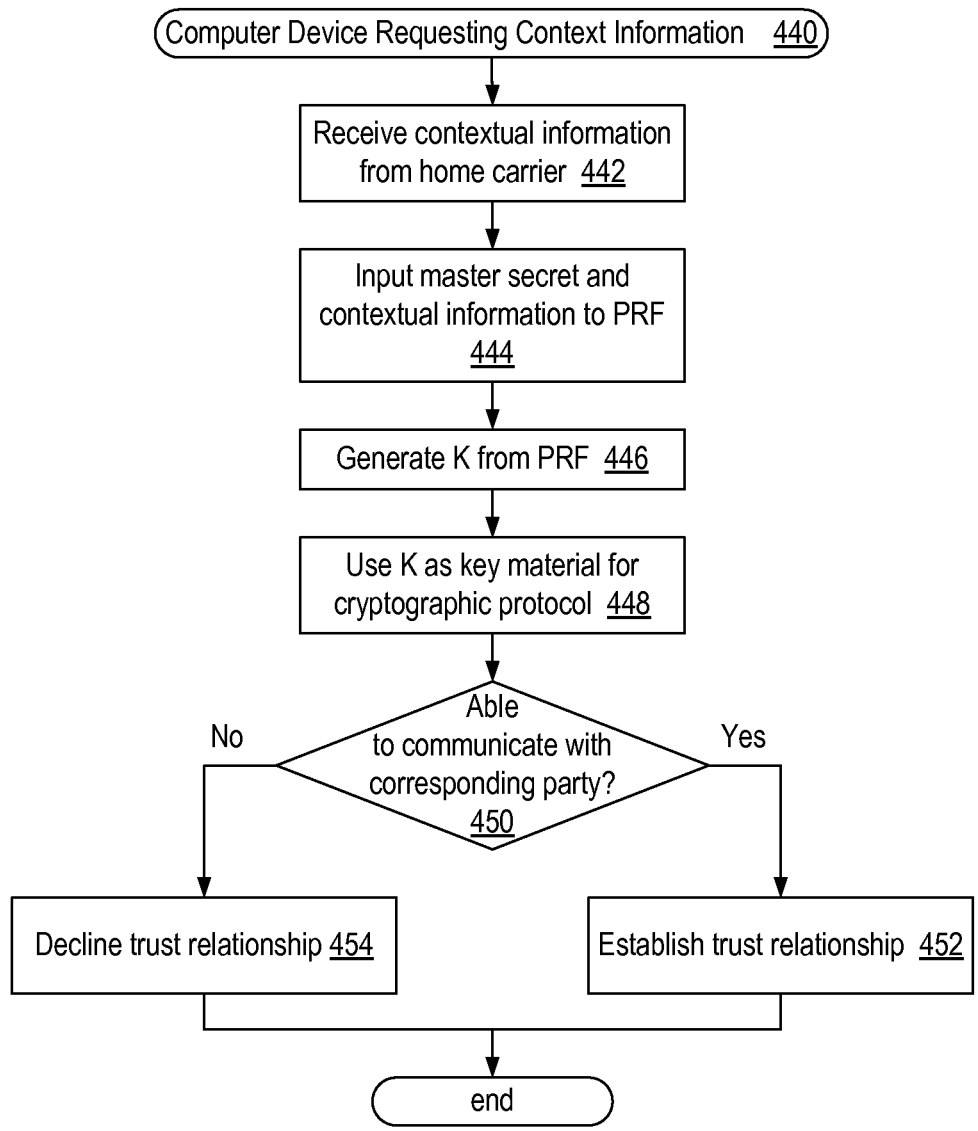
FIG. 7 is a flow diagram in accordance with another aspect of a methodology involved by the communication entity seeking first to establish a trust relationship for the communication session.
Figure 8:
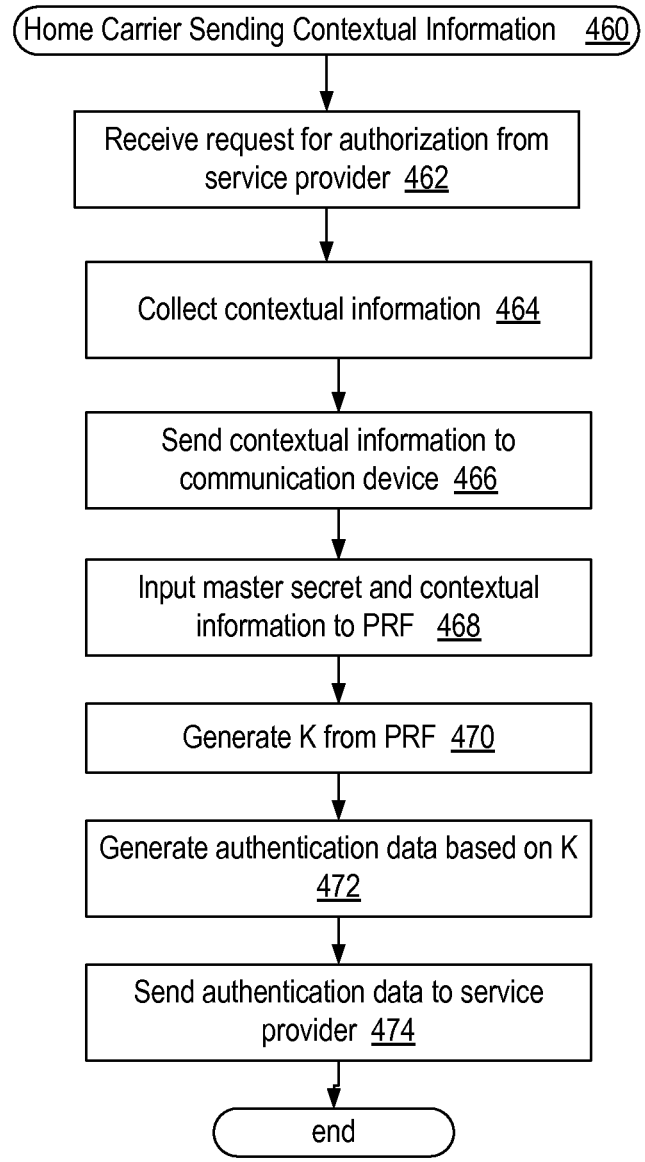
FIG. 8 is a flow diagram in accordance with the aspect of FIG. 7 of a methodology involved by the intermediary entity facilitating to establish the trust relationship.

The process is substantially similar to that as described above and is summarized in the flow diagrams of FIGS. 7 and 8. FIG. 7 depicts a methodology 440 executed by the communication device 308. In block 442, the communication device 308 receives contextual information from the home carrier 310 which is input to the PRF 320 along with the master secret in block 444. In block 446, a shared secret K 318 is generated from the PRF. In block 448, the shared secret K is used as key material for a cryptographic protocol. In block 450, a determination is made as to whether the communication device 308 can communicate with the corresponding party. If so, a trust relationship is established in block 452 and if not a trust relationship is declined in block 454.

FIG. 8 shows the corresponding methodology 460 performed by the home carrier 310. In block 462, a request for authorization is received from the service provider 312. In block 464, the home carrier 310 collects contextual information. In block 466, the contextual information are sent to the communication device. The master secret and the contextual information is input to the PRF in block 468. A shared secret K is generated from the PRF in block 470. Authentication data is generated based upon the shared secret K in block 472 and sent to the service provider in block 474.

Figure 9:
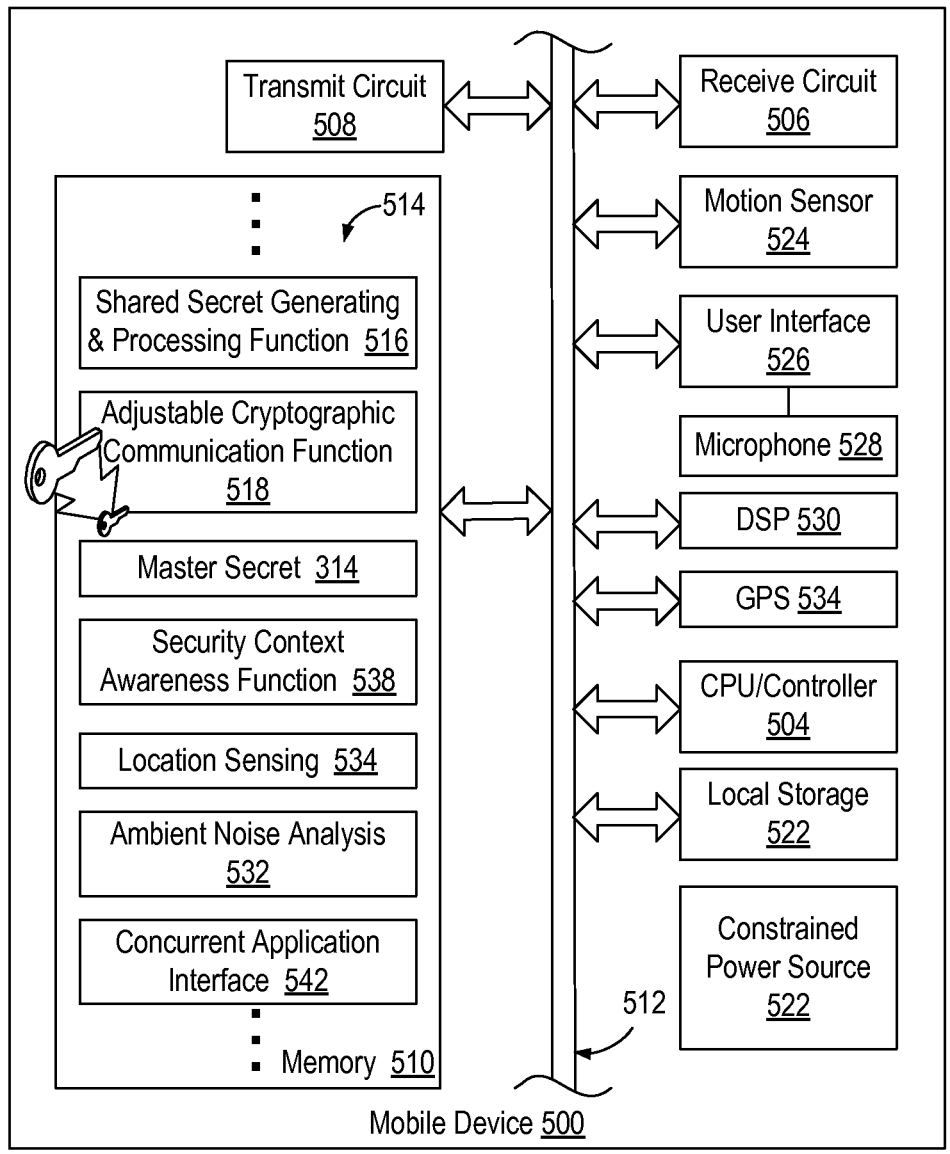
FIG. 9 is schematic drawing showing part of the hardware implementation for carrying out the aspects of the invention.

FIG. 9 schematically shows the part of the hardware implementation of an apparatus, such as the communication entities 302 and 304 shown in FIG. 4, signified by the reference numeral 500 in accordance with an exemplary aspect of the invention. In the illustrative implementation, the apparatus comprises a mobile device having a wireless communication capability. The apparatus 500 can be built and incorporated in various forms, such as a stationary computer, part of network hardware, a laptop computer, a PDA, or a cellular phone, to name just a few.

The apparatus 500 comprises a central data bus 502 linking several circuits together. The circuits include a CPU (Central Processing Unit) or a controller 504, a receive circuit 506, a transmit circuit 508, and a memory unit 510.

If the apparatus 500 is part of a wireless device, the receive and transmit circuitry 506 and 508 can be connected to a RF (Radio Frequency) circuit that is not shown in the drawing. The receive circuit 506 processes and buffers received signals before sending out to the data bus 502. On the other hand, the transmit circuit 508 processes and buffers the data from the data bus 502 before sending out of the device 500. The CPU/controller 504 performs the function of data management of the data bus 502 and further the function of general data processing, including executing the instructional contents of the memory unit 510. Each of the components 504-510 communicate across a data bus 502.

Instead of separately disposed as shown in FIG. 9, as an alternative, the transmit circuit 508 and the receive circuit 506 can be parts of the CPU/controller 504.

The memory unit 510 includes a set of instructions generally signified by the reference numeral 514. In this aspect, the instructions include, among other things, the process steps as shown and described in the flow diagrams of FIGS. 2, 3 and 5-8, depending on the role played by the apparatus 500, which steps are collectively designated by the reference numeral 516 as a "shared secret generating and processing function" as shown in FIG. 9. Included in the function 516 can be the PRF as described previously.

Included in the memory unit 510 is also a cryptographic communication function 518 for carrying out any cryptographic protocol chosen. Furthermore, stored within the same memory unit 510, among other things, is the master secret 314. The functions 516, 518 and the master secret 314 can be transferred from a different memory unit, depicted as local storage 522, to the memory unit 510, e.g., during power up of the apparatus 500.

In this aspect, the memory unit 510 is a RAM (Random Access Memory) circuit. The exemplary instruction portions 514 are software routines or modules. As mentioned above, the memory unit 510 can be tied to another memory circuit (not shown) which either can be of the volatile or nonvolatile type. As an alternative, the memory unit 510 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

The apparatus can advantageously include a motion sensor 524 for detecting motion-based contextual information. A user interface 526 can receive user inputs (e.g., tactile, audible, visual, electronic data, etc.). In particular, a microphone 528 is depicted that can additionally provide ambient noise information for processing by a digital signal processor 530 and characterization by an ambient noise analysis function 532 in memory 510. A location sensor, depicted as a GPS receiver 534, provides information for characterizing by a location sensing function 536 in memory 510.

A security context awareness function 538 can be cognizant of the above sources of contextual information as well as processing constraints of the CPU/Controller 504, constraints on available power from a power source 540, and user interaction with a concurrent application interface 542 operating from memory 510.

It should be further be noted that the processes as described and shown in FIGS. 2, 3 and 5-8 above can also be coded as computer-readable instructions carried on any computer-readable medium known in the art. In this specification and the appended claims, the term "computer-readable medium" refers to any medium that participates in providing instructions to any processor, such as the CPU/controller 504 shown and described in FIG. 9, for execution. Such a medium can be of the storage type and may take the form of a volatile or non-volatile storage medium as also described previously, for example, in the description of the memory unit 510 in FIG. 9. Such a medium can also be of the transmission type and may include a coaxial cable, a copper wire, an optical cable, and the air interface carrying acoustic or electromagnetic waves capable of carrying signals readable by machines or computers.

Finally, described in the aspect, the first, second and third communication entities 302, 304 and 306 are respectively described as the communication device 308, the home carrier 310, and the service provider 312. Different arrangements are possible within the invention. For instance, the first entity 302 can assume a different form, such as a router, part of a network or a carrier, instead of a device. Likewise, the second and third entities 304 and 306 may also assume different forms as mentioned previously. In the exemplary aspect, the shared secret is described as generated from the master secret along with the contextual information. It is conceivable that the shared secret can also be generated with more information other than that listed in Equation (A) above. For example, non-contextual information, such as the coordinates from the Global Positioning System (GPS) or the electronic identification of the communication entities can certainly serve as additional input to Equation (A). The same hold true with Equation (B) which can include other contextual information other than that as described. On the other hand, not all the contextual information as described in the exemplary aspects needs to be included to generate the shared secret. It is possible to use only partial or selected information. For instance, instead of using various topological, time-related, and transactional information for the generation of the shared secret as described, only selected topological information can be inputted to the PRF to arrive at a shared secret. Furthermore, in the exemplary aspects, the communication device 308 and the home carrier 310 are described as the entities collecting the contextual information. It surely is feasible that the service provider 312 performs the duty of contextual information collection and sends the collected information directly or indirectly to other parties. In addition, any logical blocks, circuits, and algorithm steps described in connection with the aspect can be implemented in hardware, software, firmware, or combinations thereof. It will be understood by those skilled in the art that theses and other changes in form and detail may be made therein without departing from the scope and spirit of the invention.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, a required level of security can be determined by contextual awareness, providing a learned weight to various contextual inputs.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is the to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is the to be incorporated by reference herein, but which conflicts with existing definitions, statements, or other disclosure material set forth herein, will only be incorporated to the extent that no conflict arises between that incorporated material and the existing disclosure material.

The invention claimed is:

1. A method for performing layered semantic security between a near communication device and a far communication device, comprising:
    collecting first changing contextual information regarding the near communication device;
    characterizing a first security vulnerability based upon the first changing contextual information;
    collecting second changing contextual information for a plurality of communication links between the near communication device and the far communication device, wherein the plurality of communication links include a near communication link between the near communication device and a near network interface;
    characterizing a second security vulnerability based on the second changing contextual information;
    selecting a cryptographic protocol based upon the first and second security vulnerability characterizations; and
    the near communication device establishing a secure communication with the far communication device by employing the selected cryptographic protocol in at least one communication link of the plurality of communication links.

2. The method of claim 1, wherein the near communication device comprises a mobile device.

3. The method of claim 2, wherein the first changing contextual information is based upon a location of the mobile device.

4. The method of claim 2, wherein the first changing contextual information is based upon a motion imparted to the mobile device.

5. The method of claim 2, wherein the first changing contextual information is collected by determining a performance constraint of the mobile device.

6. The method of claim 1, wherein the first changing contextual information is based upon ambient noise to the near communication device.

7. The method of claim 1, wherein the second changing contextual information is based upon a vulnerability characteristic of a communication link between the near communication device and a network interface.

8. The method of claim 1, wherein selecting the cryptographic protocol comprises selecting a length of an encryption key based on a tradeoff of processing performance and security.

9. The method of claim 1, further comprising selecting a cryptographic protocol based upon a number of replays required for errored reception.

10. The method of claim 1, further comprising establishing a trust relationship with the far communication device by:
    providing a master secret;
    generating a shared secret based on predetermined contextual information and the master secret; and
    establishing a trust relationship based on the shared secret.

11. The method of claim 10, further comprising:
    forming a second trust relationship between an intermediary device and the near communication device by providing a second master secret;
    generating a second shared secret based on predetermined contextual information and the master secret; and
    establishing a trust relationship based on the second shared secret.

12. The method of claim 10, wherein the second changing contextual information comprises topological information.

13. The method of claim 10, wherein the first changing contextual information comprises time-based information.

14. The method of claim 10, wherein the first changing contextual information comprises transactional information.

15. The method of claim 10, further comprising receiving the second changing contextual information from another communication entity.

16. The method of claim 15, further comprising cryptographically communicating with the another communication entity using the shared secret as key material.

17. The apparatus of claim 15, wherein the communication component is further configured to cryptographically communicate with the another communication entity using the shared secret as key material.

18. The method of claim 1, wherein the plurality of communication links include a far communication link between the far communication device and a far network interface.

19. At least one processor for performing layered semantic security, comprising:
- a first module configured to collect first changing contextual information regarding a near communication device;
- a second module configured to characterize a first security vulnerability based upon the first changing contextual information;
- a third module configured to collect second changing contextual information for a plurality of communication links between the near communication device and a far communication device, wherein the plurality of communication links include a near communication link between the near communication device and a near network interface;
- a fourth module configured to characterize a second security vulnerability based on the second changing contextual information;
- a fifth module configured to select a cryptographic protocol based upon the first and second security vulnerability characterizations; and
- a sixth module of the near communication device configured to establish a secure communication with the far communication device by employing the selected cryptographic protocol in at least one communication link of the plurality of communication links.

20. The at least one processor of claim 19, wherein the fifth module is further configured to select a length of an encryption key based on a tradeoff of processing performance and security.

21. The at least one processor of claim 19, wherein the second changing contextual information comprises topological information.

22. A computer program product, comprising:
- a non-transitory computer readable medium, comprising:
  - a first set of codes for causing a computer to collect first changing contextual information regarding a near communication device;
  - a second set of codes for causing the computer to characterize a first security vulnerability based upon the first changing contextual information;
  - a third set of codes for causing a computer to collect second changing contextual information for a plurality of communication links between the near communication device and a far communication device, wherein the plurality of communication links include a near communication link between the near communication device and a near network interface;
  - a fourth set of codes for causing the computer to characterize a second security vulnerability based on the second changing contextual information;
  - a fifth set of codes for causing the computer to select a cryptographic protocol based upon the first and second security vulnerability characterizations; and
  - a sixth set of codes for causing the computer to establish a secure communication with the far communication device employing the selected cryptographic protocol in at least one communication link of the plurality of communication links.

23. The computer program product of claim 22, wherein to select the cryptographic protocol comprises to select a length of an encryption key based on a tradeoff of processing performance and security.

24. The computer program product of claim 22, wherein the second changing contextual information comprises topological information.

25. An apparatus for performing layered semantic security between a near communication device and a far communication device, comprising:
- means for collecting first changing contextual information regarding the near communication device;
- means for characterizing a first security vulnerability based upon the first changing contextual information;
- means for collecting second changing contextual information for a plurality of communication links between the near communication device and the far communication device, wherein the plurality of communication links include a near communication link between the near communication device and a near network interface;
- means for characterizing a second security vulnerability based on the second changing contextual information;
- means for selecting a cryptographic protocol based upon the first and second security vulnerability characterizations; and
- means for establishing a secure communication with the far communication device by employing the selected cryptographic protocol in at least one communication link of the plurality of communication links.

26. The apparatus of claim 25, wherein the means for selecting the cryptographic protocol comprises means for selecting a length of an encryption key based on a tradeoff of processing performance and security.

27. The apparatus of claim 25, wherein the second changing contextual information comprises topological information.

28. An apparatus for establishing layered semantic security between a near communication device and a far communication device, comprising:
- a memory configured to collect first changing contextual information regarding the near communication device, and to collect second changing contextual information for a plurality of communication links between the near communication device and the far communication device, wherein the plurality of communication links include a near communication link between the near communication device and a near network interface;
- a context awareness component configured to characterize a first security vulnerability based upon the first changing contextual information, to characterize a second security vulnerability based on the second changing contextual information, and to select a cryptographic protocol based upon the first and second security vulnerability characterizations; and
- a communication component, of the near communication device, configured to establish a secure communication with the far communication device by employing the selected cryptographic protocol in at least one communication link of the plurality of communication links.

29. The apparatus of claim 28, wherein the near communication device comprises a mobile device.

30. The apparatus of claim 29, wherein the first changing contextual information is based upon a location of the mobile device.

31. The apparatus of claim 29, wherein the first changing contextual information is based upon a motion imparted to the mobile device.

32. The apparatus of claim 29, wherein the first changing contextual information is collected by determining a performance constraint of the mobile device.

33. The apparatus of claim 28, further comprising a microphone configured to collect first changing contextual information based upon ambient noise to the near communication device.

34. The apparatus of claim 28, wherein the second changing contextual information is based upon a vulnerability characteristic of a communication link between the near communication device and a network interface.

35. The apparatus of claim 28, wherein the context awareness component is further configured to select a length of an encryption key based on a tradeoff of processing performance and security, to select the cryptographic protocol.

36. The apparatus of claim 28, wherein the context awareness component is further configured to select a cryptographic protocol based upon a number of replays required for errored reception.

37. The apparatus of claim 28, wherein the communication component is further configure to establish a trust relationship with the far communication device by:
providing a master secret;
generating a shared secret based on predetermined contextual information and the master secret; and
establishing a trust relationship based on the shared secret.

38. The apparatus of claim 37, wherein the communication component is further configured to form a second trust relationship between an intermediary device and near communication device by:
providing a second master secret;
generating a second shared secret based on predetermined contextual information and the master secret; and
establishing a trust relationship based on the second shared secret.

39. The apparatus of claim 37, wherein the second changing contextual information comprises topological information.

40. The apparatus of claim 37, wherein the first changing contextual information comprises time-based information.

41. The apparatus of claim 37, wherein the first changing contextual information comprises transactional information.

42. The apparatus of claim 37, wherein the memory is further configured to collect the second contextual information from another communication entity.

\* \* \* \* \*